United States Patent
Swank et al.

(10) Patent No.: US 10,043,410 B1
(45) Date of Patent: Aug. 7, 2018

(54) METHOD AND APPARATUS FOR ADAPTIVE LEARNING

(71) Applicants: Eugene David Swank, Temecula, CA (US); David Joseph Dowling, Malibu, CA (US)

(72) Inventors: Eugene David Swank, Temecula, CA (US); David Joseph Dowling, Malibu, CA (US)

(*) Notice: Subject to any disclaimer, the term of this patent is extended or adjusted under 35 U.S.C. 154(b) by 253 days.

(21) Appl. No.: 15/089,351

(22) Filed: Apr. 1, 2016

Related U.S. Application Data

(60) Provisional application No. 62/269,400, filed on Dec. 18, 2015.

(51) Int. Cl.
| | |
|---|---|
| *G06F 21/00* | (2013.01) |
| *G09B 7/08* | (2006.01) |
| *G09B 5/06* | (2006.01) |

(52) U.S. Cl.
CPC .............. *G09B 7/08* (2013.01); *G09B 5/065* (2013.01)

(58) Field of Classification Search
USPC ............................................ 340/540; 726/21
See application file for complete search history.

(56) References Cited

U.S. PATENT DOCUMENTS

| | | | | |
|---|---|---|---|---|
| 8,201,226 B2* | 6/2012 | Duffie, III | ............. | G06F 21/335 340/5.1 |
| 2008/0059145 A1* | 3/2008 | Wood | ................. | G09B 19/06 704/2 |
| 2011/0004934 A1* | 1/2011 | Beylerian | ................ | G06F 21/62 726/21 |
| 2011/0276507 A1* | 11/2011 | O'Malley | .............. | G06Q 10/00 705/321 |
| 2012/0056742 A1* | 3/2012 | Tedesco | ............ | G06F 17/30256 340/540 |
| 2012/0158468 A1 | 6/2012 | Wheeler | | |
| 2013/0211238 A1* | 8/2013 | DeCharms | ........... | A61B 5/4824 600/418 |
| 2013/0290208 A1* | 10/2013 | Bonmassar | ........ | G06Q 10/1053 705/321 |
| 2014/0304200 A1* | 10/2014 | Wall | .................... | G06F 19/3418 706/12 |

OTHER PUBLICATIONS

Bjork, R. A., & Bjork, E. L. (1992). A new theory of disuse and an old theory of stimulus fluctuation. From learning processes to cognitive processes: Essays in honor of William K. Estes, 2, 35-67.

Carpenter, S. K., Cepeda, N. J., Rohrer, D., Kang, S. H., & Pashler, H. (2012). Using spacing to enhance diverse forms of learning: Review of recent research and implications for instruction. Educational Psychology Review, 24(3), 369-378.

(Continued)

*Primary Examiner* — Masud Ahmed
(74) *Attorney, Agent, or Firm* — Seyfarth Shaw LLP; Puya Partow-Navid

(57) ABSTRACT

A method of providing a task is presented. The method includes receiving, from a task administrator, multiple subjects to be presented in the task and presenting the task in response to a condition being satisfied. The method also include adaptively adjusting a difficulty level of a subject of the multiple subjects based at least in part on results of the task.

20 Claims, 13 Drawing Sheets

(56) References Cited

OTHER PUBLICATIONS

Karpicke, J. D., & Blunt, J. R. (2011). Retrieval practice produces more learning than elaborative studying with concept mapping. Science, 331(6018), 772-775.

Kornell, N., Hays, M. J., & Bjork, R. A. (2009). Unsuccessful retrieval attempts enhance subsequent learning. Journal of Experimental Psychology: Learning, Memory, and Cognition, 35(4), 989.

Little, J. L., Bjork, E. L., Bjork, R. A., & Angello, G. (2012). Multiple-choice tests exonerated, at least of some charges fostering test-induced learning and avoiding test-induced forgetting. Psychological Science, 23(11), 1337-1344.

Roediger, H. L., & Karpicke, J. D. (2006). The power of testing memory: Basic research and implications for educational practice. Perspectives on Psychological Science, 1(3), 181-210.

Rowland, C. A. (2014). The effect of testing versus restudy on retention: A meta-analytic review of the testing effect. Psychological Bulletin, 140(6), 1432.

Storm, B. C., Bjork, R. A., & Storm, J. C. (2010). Optimizing retrieval as a learning event: When and why expanding retrieval practice enhances long-term retention. Memory & Cognition, 38(2), 244-253.

Taylor, K., & Rohrer, D. (2010). The effects of interleaved practice. Applied Cognitive Psychology, 24(6), 837-848.

Yan, V. X., Garcia, M. A., Bjork, E. L., & Bjork, R. A. (Nov. 2013). Learning Better, Learning More: The Benefits of Expanding Retrieval Practice. 54th Annual Scientific Meeting of the Psychonomic Society, Toronto, Ontario. Nov. 14-17.

Kapur, M. (2010). Productive failure in mathematical problem solving. Instructional Science, 38(6), 523-550.

Yan, V. X. (May 10, 2016). Guest Post: Retrieval Strength Versus Storage Strength. [Blog post]. Retrieved from http://www.learningscientists.org/blog/2016/5/10-1.

Pennebaker, J. W. & Gosling, S. D. (2015). Rethinking online education: Melding the best of teaching, television, and testing. Symposium talk presented at the 27th convention of the Association for Psychological Science, New York City, NY, May 21-24.

Sheketoff, M., "App quizzes kids before unlocking gadgets," http://www.wcax.com/story/23342703/app-quizzes-kids-before-unlocking-gadgets, Published: Sep. 4, 2013.

Hiq Lockscreen, Science Mobile, LLC, https://play.google.com/store/apps/details?id=com.olyware.mathlock&hl=en.

* cited by examiner

METHOD AND APPARATUS FOR ADAPTIVE LEARNING

CROSS-REFERENCE TO RELATED APPLICATION

The present application claims the benefit of U.S. Provisional Patent Application No. 62/269,400, filed on Dec. 18, 2015 and titled "CAPTIVE PORTAL QUIZZES FOR LEARNING ON MOBILE DEVICE," the disclosure of which is expressly incorporated by reference herein in its entirety.

BACKGROUND

Field

Certain aspects of the present disclosure generally relate to adaptive learning on a mobile device and in particular, adaptive learning for access control of a mobile device based on test, such as a quiz, results.

Background

As the user base for mobile devices grows, it is desirable for parents, guardians, teachers and/or other individuals/corporations/government entities to provide access control for different components of a mobile device. Access control may be referred to as screen time access control. For example, a parent may desire to limit access to the entire device and/or limit access to specific applications. Conventional access control techniques may specify a passcode and/or set a timer for access. Still, while conventional access control techniques may prevent access to a device and/or an application, the conventional access control techniques are neither captive nor educational. That is, conventional access control techniques do not provide an engaging and/or adaptive learning environment to the user. Furthermore, in conventional access control techniques, the user may bypass the access control method in a variety of ways, such as learning the passcode or hitting the home button on the mobile device.

Therefore, it is desirable to provide a captive access control method that is educational and adaptive to the user's performance. That is, it is desirable to provide a captive access control method that provides learning based upon scientific learning-related research, knowledge, and experience. Aspects of the present disclosure are directed to adaptive learning of tasks, such as a test, provided on a device, such as a mobile device. In the present application, a test may also be referred to as a quiz. Furthermore, aspects of the present disclosure are directed to providing adaptive learning for access control to the mobile device and/or applications on a mobile device.

SUMMARY

In one aspect of the present disclosure, a method of wireless communication is disclosed. The method includes receiving, from a user or task administrator, multiple subjects to be presented in the task. The method also includes presenting the task in response to a condition being satisfied. The method further includes adaptively adjusting a difficulty level of a subject of the multiple subjects based at least in part on results of the task.

Another aspect of the present disclosure is directed to an apparatus including means for receiving, from a user or task administrator, multiple subjects to be presented in the task. The apparatus also includes means for presenting the task in response to a condition being satisfied. The apparatus further includes means for adaptively adjusting a difficulty level of a subject of the multiple subjects based at least in part on results of the task.

In another aspect of the present disclosure, a non-transitory computer-readable medium with non-transitory program code recorded thereon is disclosed. The program code for providing a task is executed by a processor and includes program code to receive, from a user or task administrator, multiple subjects to be presented in the task. The program code also includes program code to present the task in response to a condition being satisfied. The program code further includes program code to adaptively adjust a difficulty level of a subject of the multiple subjects based at least in part on results of the task.

Another aspect of the present disclosure is directed to an apparatus for providing a task having a memory unit and one or more processors coupled to the memory unit. The processor(s) is configured to receive, from a user or task administrator, multiple subjects to be presented in the task. The processor(s) is also configured to present the task in response to a condition being satisfied. The processor(s) is further configured to adaptively adjust a difficulty level of a subject or multiple subjects based at least in part on results of the task.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
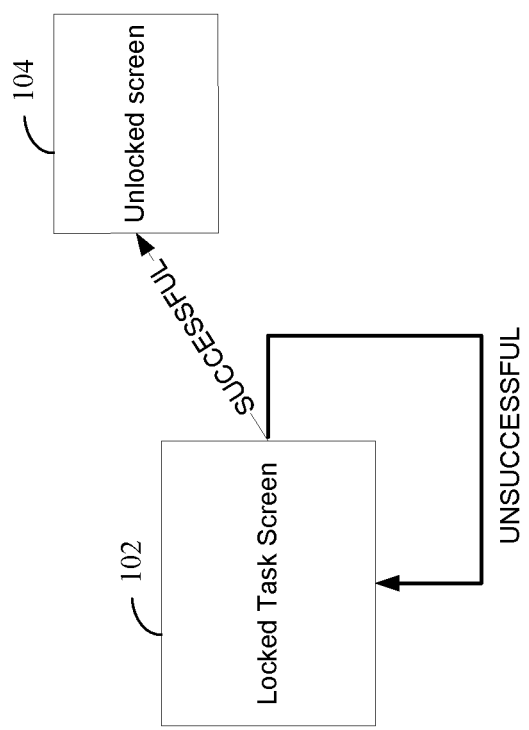
FIG. 1 is a diagram illustrating an example process of adaptive learning on a mobile device according to one aspect of the present disclosure.

FIG. 1 is a diagram illustrating an example process of adaptive learning on a mobile device according to one aspect of the present disclosure. As shown in FIG. 1, a user of the mobile device is presented with a locked task screen 102 upon interaction with the mobile device. For example, when the mobile device is idle or in a sleep-mode, touching or activating the mobile device may trigger the presentation of a locked task screen 102. In one configuration, the locked task screen is preceded by an animated splash screen (not shown). The locked task screen 102 may replace a factory set lock screen or may be presented before or after a factory set lock screen is presented. Access to the device is permitted when the device is unlocked and access to the device is limited when the device is in the locked state. For example, the user may only make emergency calls, turn off the device, check learning progress, and/or answer quiz questions when the device is in the locked state. Additionally, a user may bypass the locked state by selecting a password option and entering a password established by a task administrator, such as a parent, teacher, guardian, and/or other third party individuals/corporations/government entities.

According to an aspect of the present disclosure, the user is specified to successfully perform a task provided on the task screen 102 to gain access to the mobile device. As an example, the task may be a multiple choice quiz, an interactive audio dialogue session, an interactive video session, an interactive game, an interactive or static advertising session and/or an interactive written session. In one configuration, access to the mobile device is granted when the number of correct answers for a test is equal to or greater than a correct answer threshold. That is, when the user has successfully finished the task as prescribed, the user is presented with an unlocked screen 104. The applications on the mobile device may be accessible to the user via the unlocked screen 104. The mobile device may be unlocked for an unlimited time or a set time period after the successfully finishing the task.

Alternatively, if the user fails to successfully complete the task, the device remains in the locked state (e.g., locked task screen 102). The task may be unsuccessfully completed if the number of correct answers is less than a threshold and/or if the task was not completed within a prescribed time period. The user may be presented with the locked task screen 102 after failing to successfully complete the task and the user may re-attempt to complete the task when the user interacts with the device. When re-attempting to perform the task, the user is again presented with a task on locked task screen 102.

The locked task screen 102 may also be specified to unlock the locked task screen via a password supplied by task administrator. Furthermore, the locked task screen 102 may also provide the ability to dial 911 or reach emergency contacts provided by a user or task administrator. Furthermore, the locked task screen 102 may provide the ability to select the device user, turn audio on or off, and to view progress reports within the locked task screen environment.

In one configuration, when a correct answer is input on the locked task screen, an interstitial screen is displayed with a text message, icon, and/or graphic to indicate the correct answer. The correct answer may also be displayed on the interstitial screen. Furthermore, when an incorrect answer is input on the locked task screen, an interstitial screen may display a text message, icon, and/or graphic indicating the incorrect answer, providing a hint option, and/or including a try again button. The hint option may provide additional information to help the user answer the same question, immediately or in the future, and/or a similar type of question in the future.

The number of task re-attempts (e.g., re-attempt threshold) may be defined by a task administrator, such as a parent, teacher, guardian, or individual/corporation/government entity, or may be a default setting. If the number of re-attempts exceeds the re-attempt threshold, the system may prevent the user from re-taking a test for a predetermined time period. The task administrator may be a third party, such as a parent, guardian, or teacher. The task administrator may remotely access the device and may remotely configure the task settings. For example, the task administrator can remotely access the device to update emergency contact phone numbers included on the locked task screen 102. In another example, the task administrator may remotely access the device to remotely unlock or remove the task screen from the device for a period of time.

The task administrator may also remotely adjust the locked task screen 102 settings, such as, learning category or subject matter, a number of questions to answer correctly before a device unlock, a maximum number of quiz questions per day, and time between tasks. The task administrator may also input user name(s) for each device and/or contact phone numbers. Additionally, the task administrator may also upload questions and/or content to be included in the tasks.

It should be noted that FIG. 1 presents a high-level interaction session between the user and the mobile device. Aspects of the present disclosure are not limited to the steps shown in FIG. 1 as alternative steps or additional steps are also contemplated. Furthermore, aspects of the present disclosure are directed to adaptive learning for tasks. That is, tasks may increase or decrease in difficulty based on the user's performance. The tasks are not limited to unlocking a mobile device and may be specified for other purposes, such as homework or entertainment. Furthermore, the task may be referred to as a test or quiz. Still, aspects of the present disclosure are not intended to limit the task to a test or quiz. Of course, other types of tasks are contemplated.

In one aspect of the present disclosure, the adaptive learning application is installed on a mobile device. The adaptive learning application may include a captive portal lock screen (e.g., locked task screen) that regulates access to the mobile device. The captive portal lock screen may replace the default lock screen of a mobile device, or may be initiated (e.g., displayed) when attempting to unlock the mobile device via the default lock screen, or may appear immediately before or after the default lock screen. The captive portal lock screen may provide a task, such as a quiz, for gaining access to the mobile device. After correctly performing the task, the user may have restricted or unrestricted access to the mobile device for a configurable amount of time. It should be noted that the user is provided access to emergency services via their mobile device at any time in the event of an emergency. The user's (e.g., child's) interaction with the application or interface may vary based on their skill level and/or subject matter.

The adaptive learning application may include a graphical interface for a captive portal (e.g., walled garden), whereby the user interacts with the graphical interface to obtain access to the mobile device. As previously discussed, the adaptive learning process may gamify the learning process while allowing a task administrator to control the level of mobile device access (e.g., screen time) and the time spent learning on the mobile device. The task administrator can monitor progress and modify the functionality of the device remotely, such as via a cloud based interface or a dashboard. The cloud based interface may be a Web (e.g., Internet) based interface.

User information, such as name, grade, and/or age may be input by the task administrator during the sign-up process. This information may be used to develop and show a category or subject specific diagnostic test during a user's first interaction with the lock screen. For example, there may be a math diagnostic test for $1^{st}$ graders and a different math diagnostic test for $4^{th}$ graders. After completion of this diagnostic test, the application determines the correct level of question difficultly to apply to each user.

In one example, a user is presented with a series of multiple choice questions. A task administrator may configure testing options, such as frequency, difficulty, and/or subject matter for the multiple choice questions. The configuration of testing options may be performed on the device that presents the questions and/or via a separate device. The testing options may be stored on a networking cloud. In one configuration, the quiz is adaptable such that the quiz's content and difficulty level are set to the interest and/or skill level of the user. The task may be adjusted at the mobile device and/or may be adjusted at the cloud and downloaded to the mobile device.

In the present example, upon correctly answering the questions, the user is granted access to the mobile device. In one configuration, the granted access is set for a predetermined time period, such that the user does not have an unlimited time period for access. The predetermined time period may be set by a task administrator or may be a default setting. Furthermore, the user may obtain either full or partial access to use the mobile device for a specified time duration. Partial access refers to the user having access to specific applications on a device. As an example of partial access, the user may have access to a web browser and may not have access to text messaging.

After the predetermined time period has expired, the user may be redirected to a graphical interface to answer a new set of test questions and/or to perform a new task, such as reading a passage from a story, to obtain subsequent access to the mobile device. The unlock and lock process may repeat in a continuous loop. In one configuration, the number of locks and unlocks may be limited. For example, the user may be allowed to lock and unlock the device ten times a day. One purpose of this learning process is for the user to be educated before gaining access to their mobile device. This process may also be used to assess the aptitude of the user.

In another example, a user may interact with the interface of the mobile device by reading a story displayed on the mobile device's screen. The adaptive learning application may use voice recognition to determine whether the child is properly reading the short story. Furthermore, the adaptive learning application may assist with mispronounced and/or unrecognized words or phrases. In this example, the adaptive learning application may assess the user's reading aptitude and provide reading practice before granting access to the mobile devices.

When the reading condition is satisfied, the user may obtain full or partial access to the mobile device for a predetermined time period. As previously discussed, the predetermined time period may be set by a task administrator or may be a default setting. Additionally, after the predetermined time period has expired, the user may be redirected to a graphical interface to read another story and/or perform a new task, such as answering questions, for obtaining subsequent access to the mobile device.

In another example, the task may be an interactive video session. For the interactive video session the user may need to answer questions related to a displayed video. In yet another example, the task may be an interactive written session. For the interactive written session the user may be presented with a prompt and the user may need to write an essay in response to the prompt. As another example, for the interactive written session, the user may write-in relevant information for a specified category. For example, the user may be prompted to input their blood pressure reading.

In another example, the task may be interacting with, or viewing an advertisement. The individual advertisement may vary in length and the number of advertisements to be viewed and the frequency of viewing may be set by the task administrator or by default.

In one configuration, access to the device is also remotely granted by the parent or task administrator via a dashboard, such as a Learning Dashboard. For example, the task administrator may grant access to the device when the user completes their homework, performs chores, and/or performs a noteworthy achievement. In this example, the task administrator may add tokens, such as unlock tokens, to the network cloud via a device or application, such as a web portal. The token allows the user to obtain access to the mobile device for an unlimited or predetermined time period.

The cloud based dashboard also allows task administrators to remotely input settings for the locked task screen on the mobile device, as well as review a progress "Report Card" and make edits to their account information. The progress "Report Card" may be customized by the task administrator by categories, such as user, device, learning category or subject matter and/or time period. Progress reports are then generated including time spent, number of tasks, task progress, and examples of correct and incorrect answers to task questions. In addition, the Report Card includes a comments or talking points section for the task administrator providing feedback, hints and encouragement (based on progress) they can share with the user(s).

Additionally, in one configuration, the task screen interface may include graphics, such as a photo, and may audibly ask questions regarding the graphic. For example, the graphic may be a picture of a fruit bowl and the question may ask to identify a number of oranges in the fruit bowl. The user may verbally answer the questions and the voice recognition system may interpret the answer. Questions may also be answered in writing. Upon correctly answering the questions the user may be granted temporary access to the mobile device.

Figure 2:
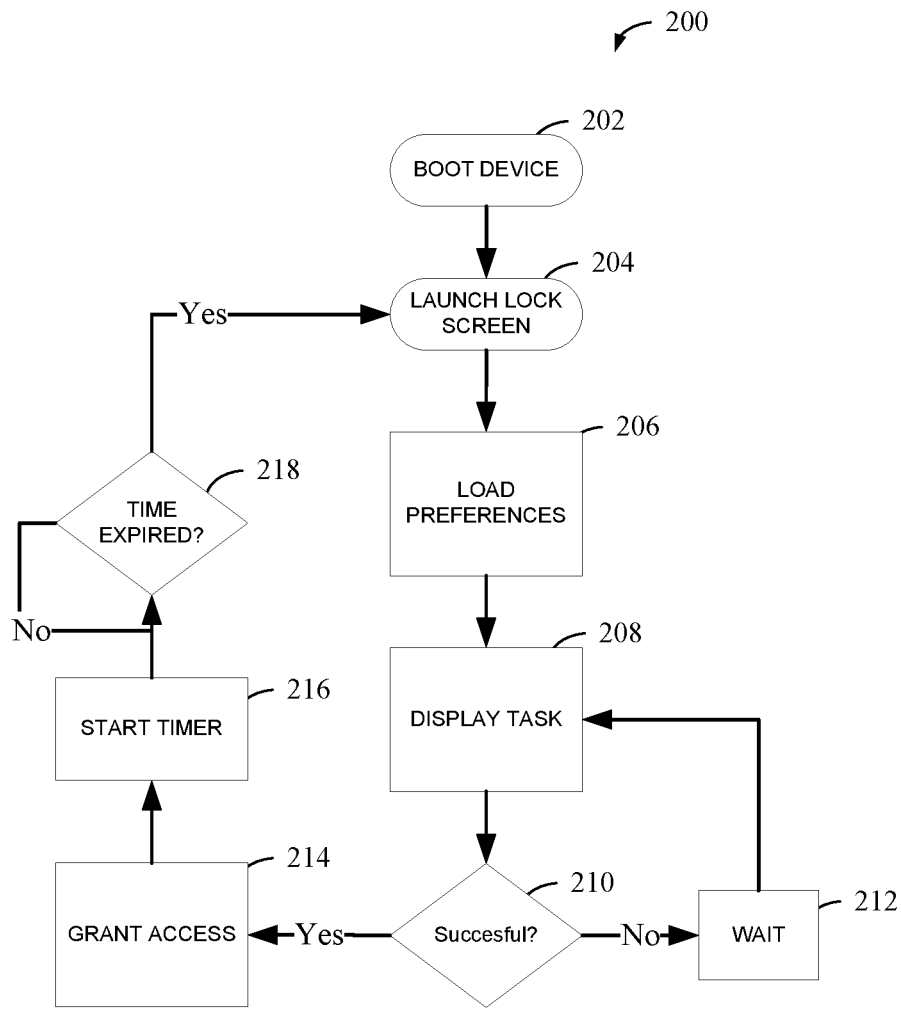
FIG. 2 is a flowchart illustrating an example process of adaptive learning on a mobile device according to one aspect of the present disclosure

FIG. 2 is a flowchart 200 illustrating an example of adaptive learning according to one aspect of the present disclosure. As shown in FIG. 2, at block 202, the mobile device boots up. A proprietary adaptive learning application may be loaded with the initial boot process. At block 204, upon booting the device, the adaptive learning application launches a locked screen on the mobile device. In one configuration, either simultaneous to or subsequent to launching the lock screen, the adaptive learning application loads various preferences and default settings from a database on the cloud (block 206). The preferences and default settings may be used to initialize a test to be presented to a user. Additionally or alternatively, some or all of the preferences and default settings may be saved in a local memory of the mobile device. Upon an attempt to use the mobile device, the adaptive learning application displays a task to be performed (block 208). The task may be a quiz or other task, such as reading a story. The task and/or task preferences may be initialized with the loaded preferences.

As previously discussed, the user must successfully perform the task to obtain access to the mobile device. At block 210, the adaptive learning application determines if the task was successfully completed. The task may be successfully completed if a number of correct answers is greater than or equal to an answer threshold and/or if the task was performed before the expiration of a timer. In another example, the task is successfully completed if a number of correct words of a read story are greater than or equal to a word threshold and if the story was completed before the expiration of a timer. Of course, other criteria may also be used to determine whether the task was successfully completed.

In one configuration, if the user fails to complete the task, the adaptive learning application waits a predefined amount of time, at block 212, before displaying the task again (block 208). In one configuration, at block 212, the adaptive learning application may adaptively adjust the difficulty level of the test based on a variety of factors, including but not limited to, the difficulty level of the current test, the user's personal preferences, and/or a cumulative test performance score based at least in part on the past test results. For example, after failing a predetermined number of tasks, the difficulty of the task may be decreased. Additionally, or alternatively, the difficulty of a specific subject matter may be adjusted while the difficulty of other subject matter remains the same. After adjustment of the difficulty level, the adaptive learning application may display a new task at block 208.

When the user successfully completes the task, at block 210, the adaptive learning application grants access to the mobile device. In one configuration, after granting the access, the adaptive learning application may start a timer, at block 216, to allow the access for a predetermined time period. The adaptive learning application may check whether the timer has expired at block 218. If the timer has expired, the adaptive learning application displays the lock screen (block 204). Otherwise, the adaptive learning continues to grant access while continuing to determine whether the time has expired (block 218).

The flowchart diagram for adaptive learning on the mobile device as illustrated in FIG. 2 and described above is one example process of adaptive learning. Alternative and/or additional processes for adaptive learning on the mobile device are contemplated.

Figure 3:
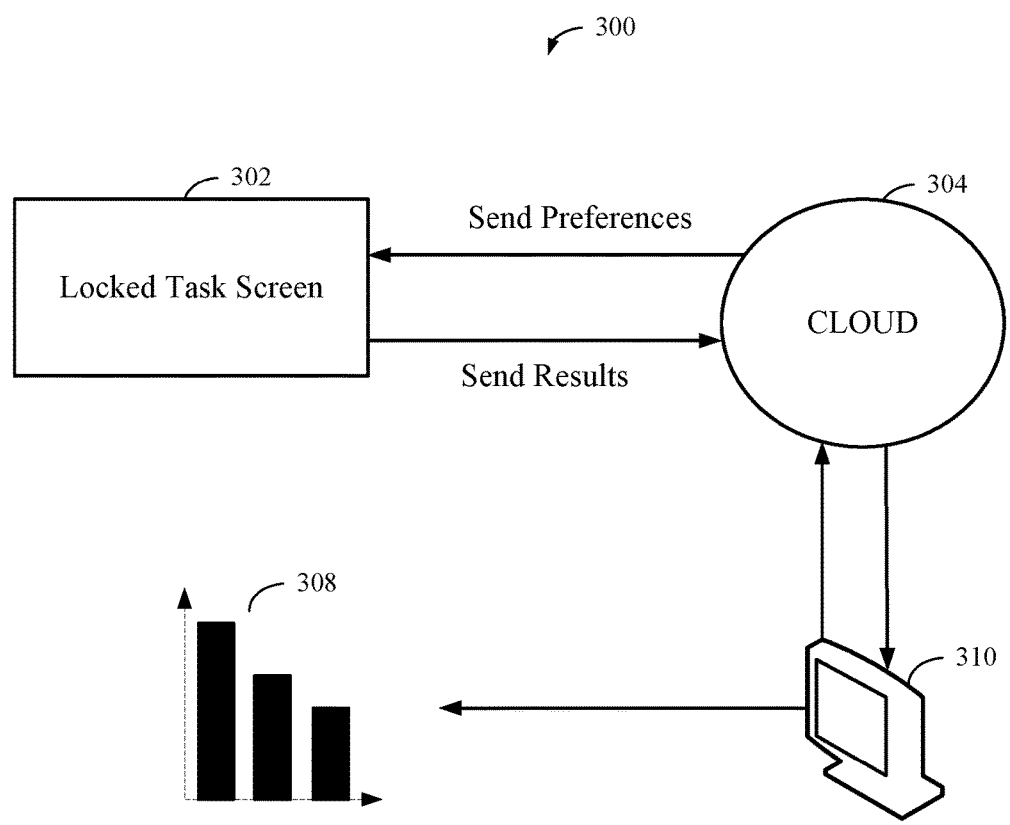
FIG. 3 is a diagram illustrating an example cloud based adaptive learning model according to one aspect of the present disclosure.

FIG. 3 is a diagram illustrating an example cloud based adaptive learning model 300 according to one aspect of the present disclosure. As shown in FIG. 3, an adaptive learning model 300 includes a task based lock screen 302, a network cloud 304, a web-based adaptive learning interface/application 310 for managing preferences and/or learning parameters, and a reporting interface 308.

In one configuration, the network cloud 304 provides storage and networking capabilities to connected applications and users. For example, the network cloud 304 may send the test preferences and learning parameters to the task based lock screen 302 for presenting a task to the user. The task based lock screen 302 may send the task results and other user data to the network cloud 304 for storage. In another example, when the user attempts to wake up the device from a sleeping event and/or after the unlock duration has expired, the adaptive learning application may retrieve and synchronize the local device preferences with the preferences stored in the cloud.

In one configuration, different preferences may be saved for multiple users associated with a device. For example, a device may be used by siblings of different ages. Thus, a task that is applicable to the older sibling may not be applicable to the younger sibling. Therefore, it may be desirable to store different user preferences for one device. A user-based task may be initialized by identifying a specific user at the lock screen or task screen.

Additionally, the network cloud 304 may also interact with the web-based adaptive learning interface/application 310 to allow a user or task administrator to manage test preferences and/or learning parameters. The web-based adaptive learning interface/application 310 may also interact with the reporting interface 308 to provide reports and/or alerts related to the user's cumulative learning sessions (e.g., tasks) or a specific task. The web-based interface/application 310 can be a portal that is used to remotely monitor the quiz results, input quiz questions, and/or to set preferences for the adaptive learning application.

Figure 4A:
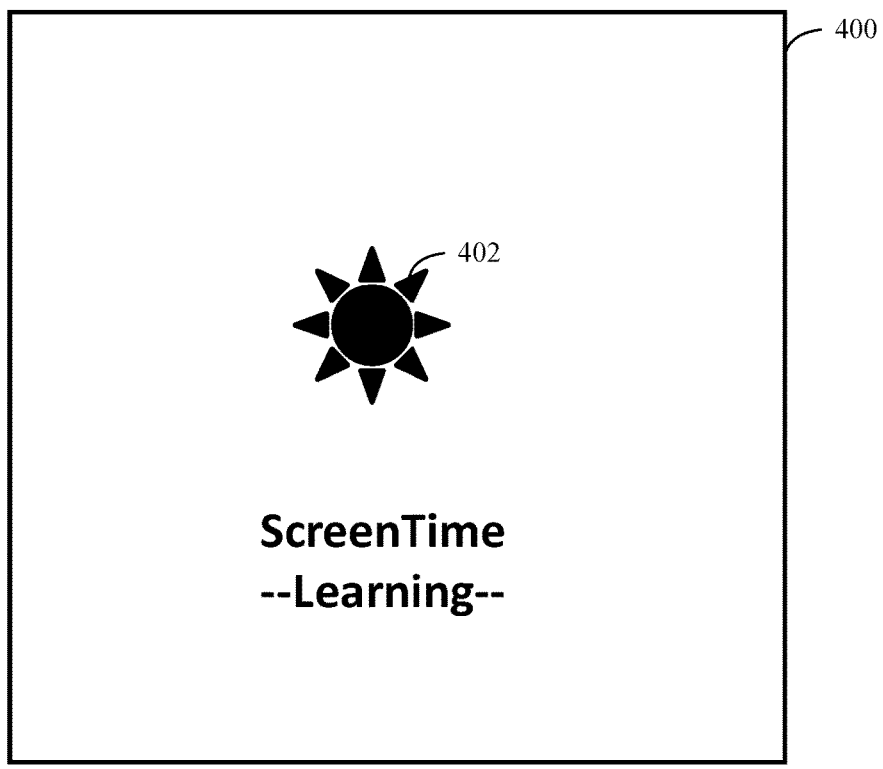
FIGS. 4A, 4B, 4C, 4D, 4E, 4F, and 4G are diagrams illustrating example test screens according to one aspect of the present disclosure.
Figure 4B:
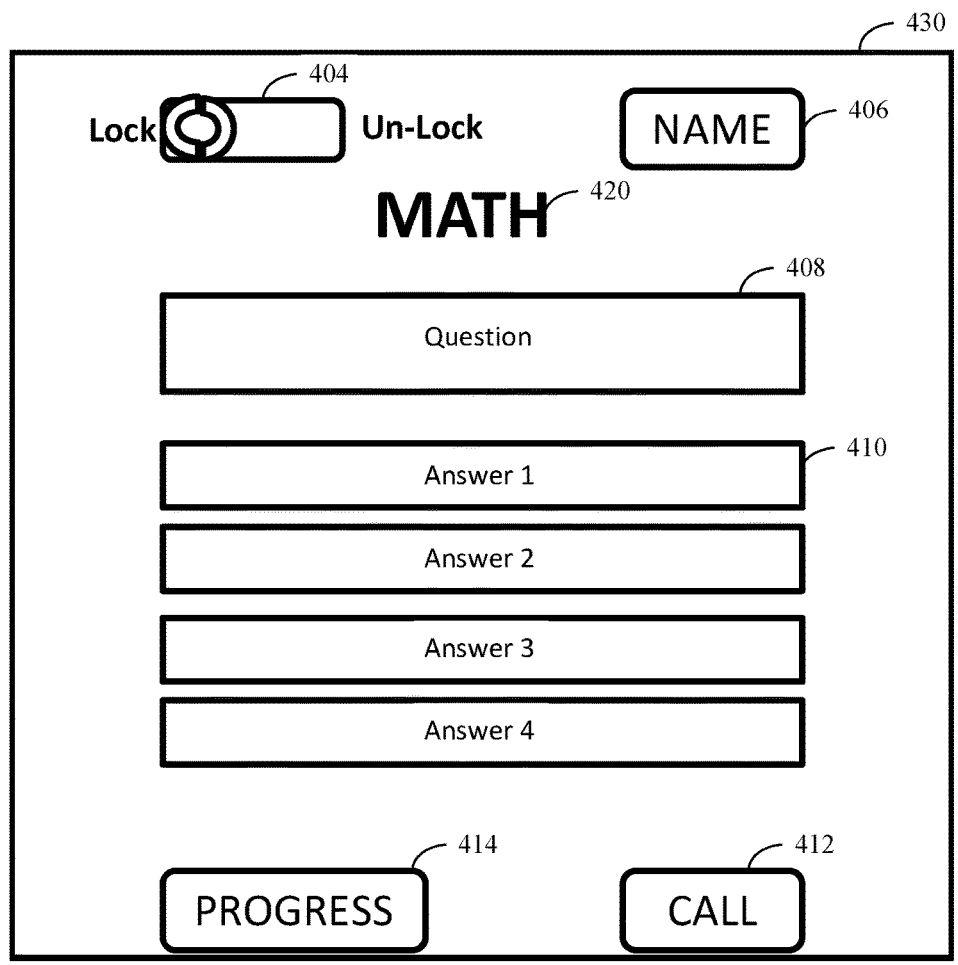

FIG. 4A illustrates an example of a boot screen 400 according to one aspect of the present disclosure. The boot screen 400 may include an animation 402. Furthermore, the boot screen 400 may be shown prior to the locked task screen. FIG. 4B illustrates an example of a locked task screen 430 according to an aspect of the present disclosure. As shown in FIG. 4B, the locked task screen 430 includes a lock button 404, a name indicator 406, a subject indicator 420, a question 408 related to the subject, and multiple answers 410. The locked task screen 430 may also include a progress button 414 for displaying task progress and a call button 412 for making emergency calls.

In one configuration, one or more users may be registered for a device. Thus, in the example of FIG. 4B, the name indicator 406 is specified to indicate the name of the active user for the locked task screen 430. Furthermore, the lock button 404 may be used to unlock the device. In one configuration, when attempting to unlock the device via the lock button 404, the user is prompted for a password and the device is unlocked when the correct password is input. Furthermore, the locked state may be set as default. As shown in FIG. 4B, the task is a answering a math question. Of course, the task is not limited to math questions and other tasks may be presented. For example, the task screen may provide quiz questions in multimedia formats, including, but not limited to: text, graphics, audio, and video.

Figure 4C:
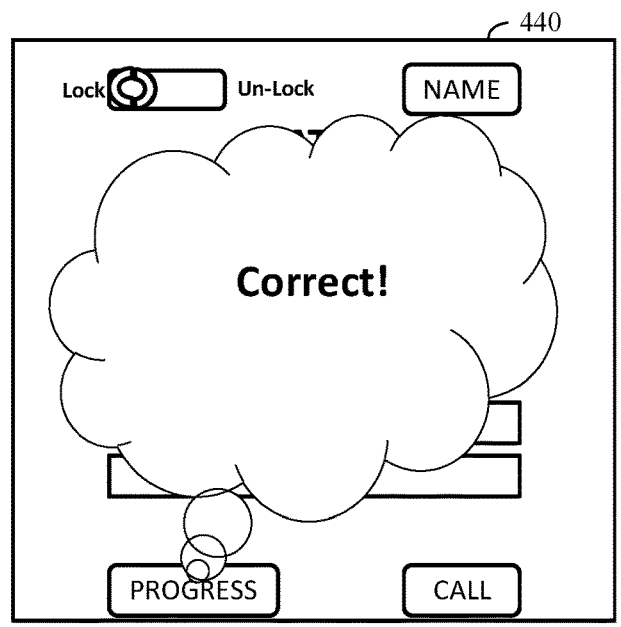
Figure 4D:
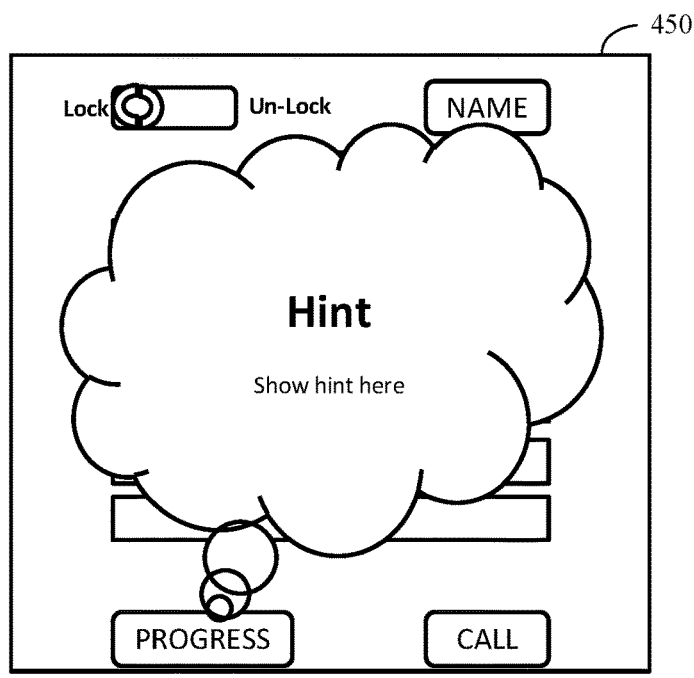

In FIG. 4B, the subject indicator 420 indicates the subject (e.g., math) and presents a question 408 related to the subject. Furthermore, the question 408 may be a multiple-choice question, thus, one or more answers 410 may be presented. In this example, the user is prompted to select the correct answer from the presented answers 410. As shown in FIG. 4C, the user may be presented with a correct answer screen 440 when the user selects the correct answer from the presented answers 410. This correct answer screen may include the correct answer restated (not shown). As shown in FIG. 4D, in another example, the user may be presented with a hint screen 450 when the user selects the incorrect answer from the presented answers 410. This hint screen may include a try again button (not shown). Additionally, or alternatively, the user may request a hint from a hint button (not shown).

Figure 4E:
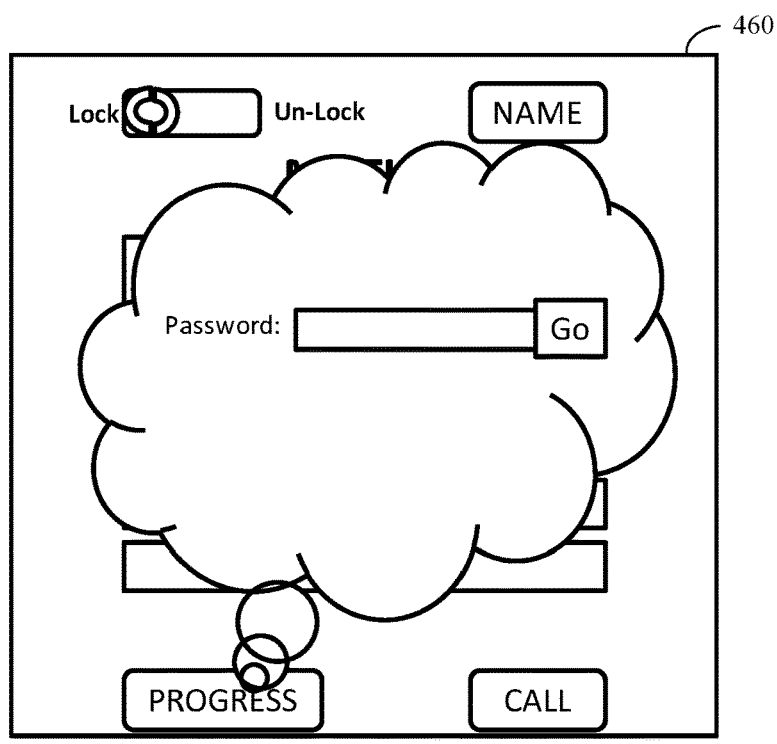
Figure 4F:
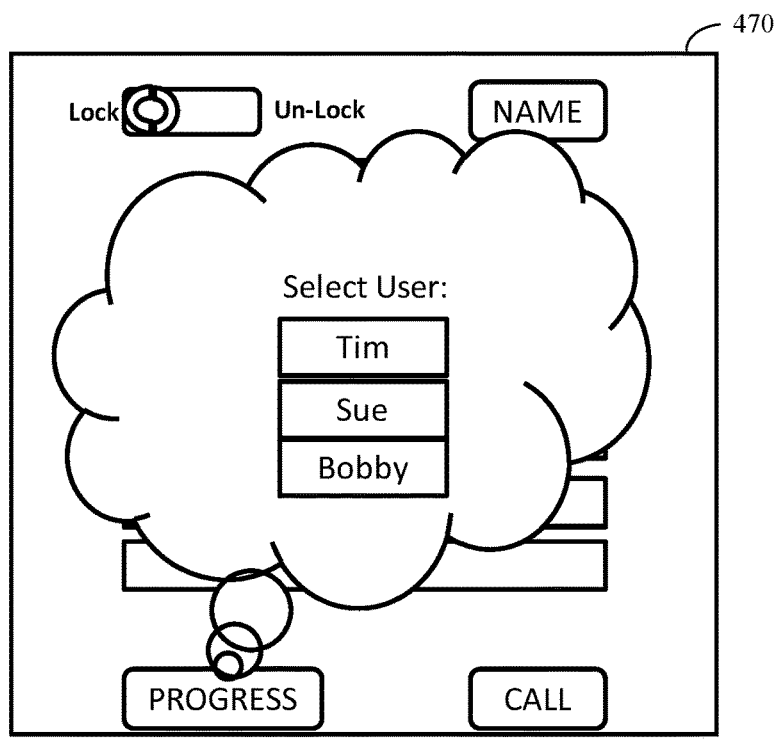

FIG. 4E illustrates an example of a password input screen 460. As previously discussed, the password input screen 460 may be displayed when attempting to unlock the phone via the lock button 404. FIG. 4F illustrates an example of a user selection screen 470. As previously discussed, one or more users may be configured for a device. Accordingly, one of the users may be selected via the user selection screen 470.

Figure 4G:
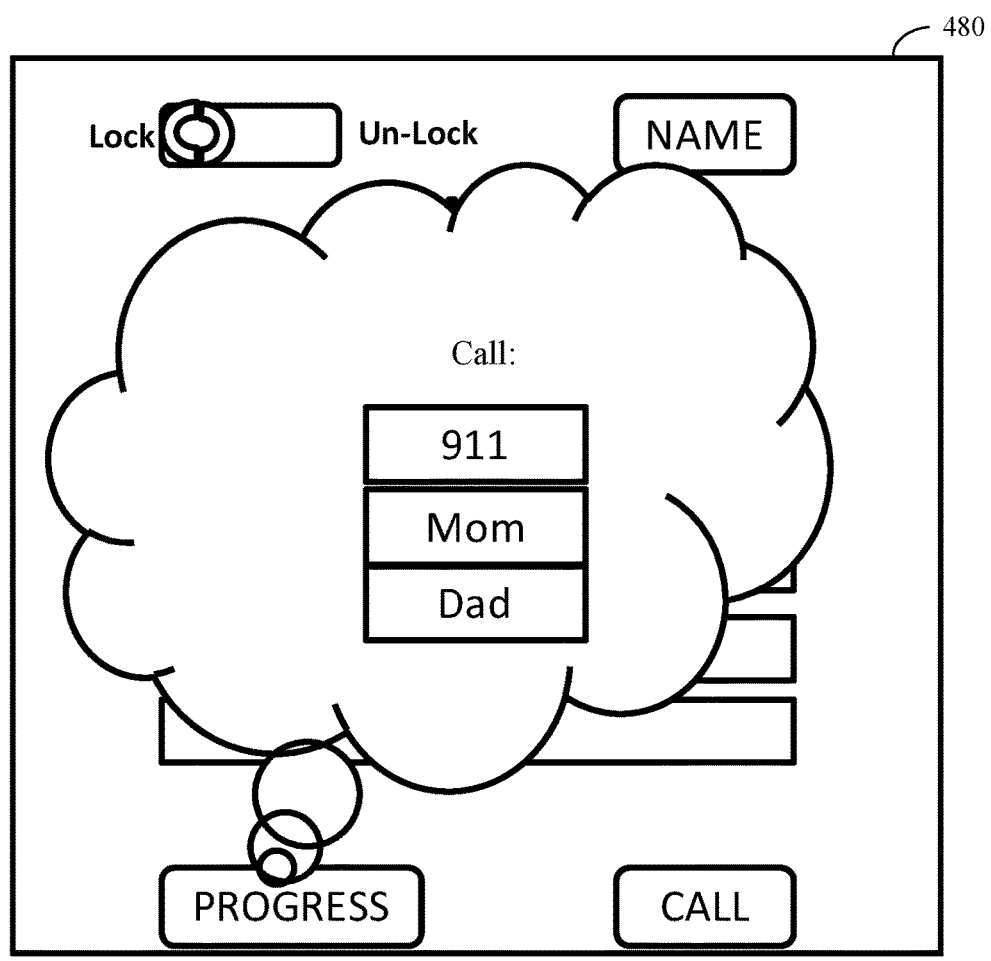

FIG. 4G illustrates an example of an emergency number screen 480. As previously discussed, the user may make an emergency call via the call button 412. As shown in FIG. 4G, the emergency call numbers may include, but are not limited to, 911 and/or the user's parents/guardian.

Various forms of interactive dialogues between the user and the task screen may be available. For example, in one example, a captive portal, or a quiz based session may be provided to the user. In another example, the user may choose an intelligent dictation task where the user reads content and the adaptive learning application determines if the user is reading properly.

Figure 5:
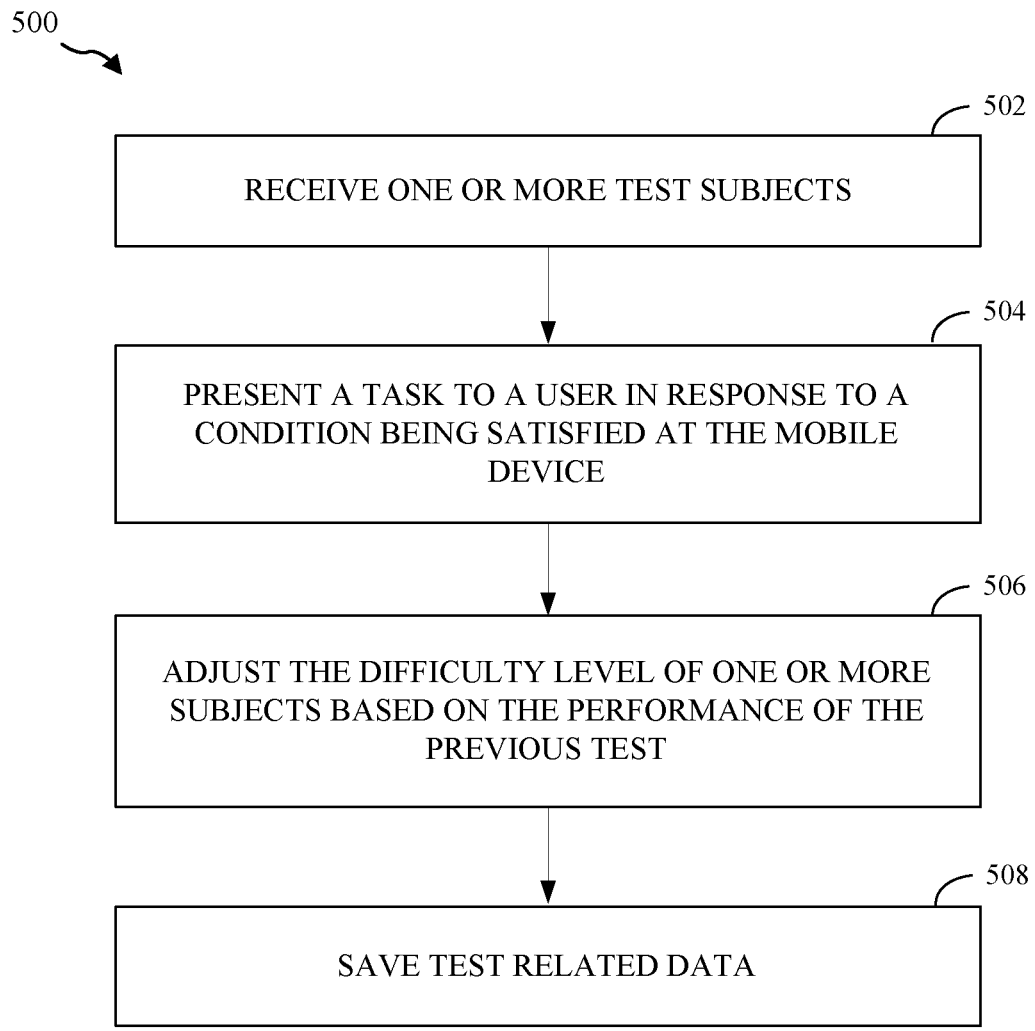
FIG. 5 is a flow diagram illustrating a method for adaptive learning via a mobile device according to one aspect of the present disclosure.

FIG. 5 is a flow diagram illustrating a method 500 for adaptive learning according to one aspect of the present disclosure. Aspects of the present disclosure are not limited to the steps of the method 500 as alternative or additional steps are possible. In the example shown in FIG. 5, the task is a test. As shown in FIG. 5, at block 502, an adaptive learning application receives one or more test subjects. The subject may be received from a cloud base database. For example, test subjects may include math, history, literature, and/or science. The test subjects may be received at a scheduled time, received on demand, and/or received in response to an event, such as a user login. The test subjects may also be pre-loaded or cached on the mobile device.

At block 504, the adaptive learning application presents a task, such as a test, to a user in response to a condition being satisfied at the mobile device. For example, the condition may be an attempt to use the mobile device. The test may include one or more of the subjects received at block 502. After successfully completing the test, the mobile device may be unlocked (not shown). After a test is completed, regardless of whether the test was successfully completed, at block 506, the user's ability level and the next question difficulty level may be assessed by the application. The difficulty of some subjects may increase while the difficulty of other subjects may decrease. The difficulty level may be adjusted so that each subject remains at an adequate level of challenge for the user (e.g., test taker/task performer).

In one configuration, item response theory (IRT) is specified to dynamically adjust test difficulty. IRT is specified to estimate the underlying ability level of test-takers. Furthermore, IRT is based on the idea that a probability of a correct answer is based on both user ability (e.g., person parameter) and question difficulty (e.g., an item parameter). The person parameter may be based on a user's underlying latent ability. The latent ability refers to a user's knowledge in a subject, such as algebra knowledge. The item parameter may be based on a combination of:

a) Difficulty: The proportion of test-takers that are able to answer this question correctly, b) Discrimination: The variation in the rate of success of individuals based on their ability level. For example, for an item with low discrimination the number of correct answer may have a similar proportion between low-performers and high-performers. In another example, for an item with high discrimination the number of correct answers for low-performers answer is less than the number of correct answers for high-performers, and c) Lower asymptote that represents guessing (e.g., 25% as the chance/guessing baseline for multiple-choice questions with four response options). That is, the item parameter assumes that a user may be guessing. Thus, the guessing may be accounted for as shown in EQUATION 2.

In comparison to conventional testing methods, IRT improves student testing by estimating the test-taker's ability on a question-by-question basis. That is, the adaptive learning application may estimate the test-taker's ability level and select the next question based on test-taker's ability level. Accordingly, the testing is improved by not presenting questions that are too easy or too hard for a test-taker. Furthermore, the testing is improved by presenting questions tailored to be within the test-taker's "challenge zone."

As discussed above, IRT may be specified to adapt questions to a user's "challenge zone." Furthermore, IRT may also be specified as a metric for the difficulty rating for each quiz question. That is, each time a question is presented, the difficulty level (e.g., item parameter) may be recalculated based on the IRT. In one configuration, when a new question is introduced into the learning system, the initial difficulty rating may be based upon a set of criteria, such as those published per grade level by the US Department of Education (DOE). The "difficulty level" refers to a question that a child in the corresponding grade should be able to master.

Each difficulty level may be divided into 10 sub levels, such as ten different sub levels, that correspond to the curriculum a child should be able to master in the time period of a specific class grade. For example, the DOE's curriculum may define that a child in first grade should be able to master a first task in the beginning of the year, master a second task in the middle of the year, and master a third task at the end of the year. Thus, if a question represents a concept that falls into the description of the first task, then the question would be assigned a difficulty level of 1.0. Additionally, a question corresponding to the second task may be assigned a difficulty level of 1.5, and a question corresponding to the third task may be assigned a difficulty level of 1.9. Based on the IRT, the difficulty level may be assessed and adjusted every time the question is presented.

At block 508, the adaptive learning application may save test related data, such as a test state, test results, and/or the test preferences. The test data may be saved locally and/or remotely. Additionally, a corresponding "level" designation may be provided for each user based on their competency and/or mastery in answering questions.

In one configuration, each user is individually assessed for each subject. For example a user may be at level 2.2 for math and level 1.5 for science. Furthermore, a user may be assessed a different level for sub-categories of a subject. For example, a user may be a level 1.3 for multiplication tables and level 1.6 for addition and subtraction within the math subject. During an initial registration period, the user or the task administrator inputs the user's school grade level to be used as a starting point (e.g., a diagnostic test) to assess the user's aptitude and corresponding grade level. The user may be initially presented with questions in each subject that match their current school grade level. The level may be adjusted based upon the user's mastery of the questions in each subject. Mastery may be determined by either an average number of correctly answered questions per subject at that difficulty level or a determined learning event. A learning event refers to mastery of a subject in which the user was previously struggling. A user has mastered a subject when the probability of the user answering questions of the current difficulty level is greater than or equal to a threshold. For example, the threshold may be 50% and the user may be considered a master when the probability of answering the questions correctly is 60%. Mastery may be determined as follows:

$$P=1/(1+\exp(-(l-d))) \qquad (1)$$

In EQUATION 1, P is probability of answering question correctly, l is the current assessed proficiency level, and d is difficulty level of question. Thus, a subject may be mastered when P is greater than a threshold.

In one configuration, when a user answers a question correctly, the event is recorded as a correct answer and given a weight of 1 (e.g., correct). Alternatively, when the user answers the question incorrectly, then the user is presented with a hint to help the user understand the question. For example, if the question is a math question with order of operation, the hint may remind the user that the order of operation is multiple, divide, add, and subtract. Furthermore, when the user answers the question incorrectly, the event is recorded as an incorrect answer with a weight of 0.

Additionally, in one configuration, when the user answers the question correctly after being presented with the hint, a score of 1 is recorded in the database. Following the scoring, the adaptive learning application may randomly mix in a question of the same type at a later time. Questions of the same type refer to a question in which the subject matter is the same as the previous question. For example a question of the type math and subtype addition up to 10 such as 1+9=10 would be of the same type as 2+5=7 as both questions are within the scope of the same subtype. Additionally, in one configuration, if the user correctly answers the follow up random question, the adaptive learning application records the event as a correct answer with a weight of 2. The elevated weighting is given due to the higher probability that the user has mastered the given concept. When the user has answered a threshold of questions, such as ten or more questions, that correspond to the same subject type and has a predetermine average of correct answers, the user progresses to the next level for that subject. The user may also move down a level if the average score is less than a predetermined threshold.

The adaptive learning application may also adjust the task difficulty level based on the user's motivational mindset. The motivational mindset may be selected by a user or a task administrator and/or assessed by the adaptive learning application based on the user's interaction with an interface of the adaptive learning application. In one configuration, the adaptive learning application may consider whether the user is more influenced by intrinsic or extrinsic motivational factors. This assessment may be used to determine the proper feedback for correct answers and/or when to progress to a new level/subject matter. For example, the adaptive learning application may provide a digital emoticon in response to a correct response in contrast to digital tokens that may be redeemed to tangible prizes, or vice versa, depending on the user's preference of learning incentives.

Figure 6:
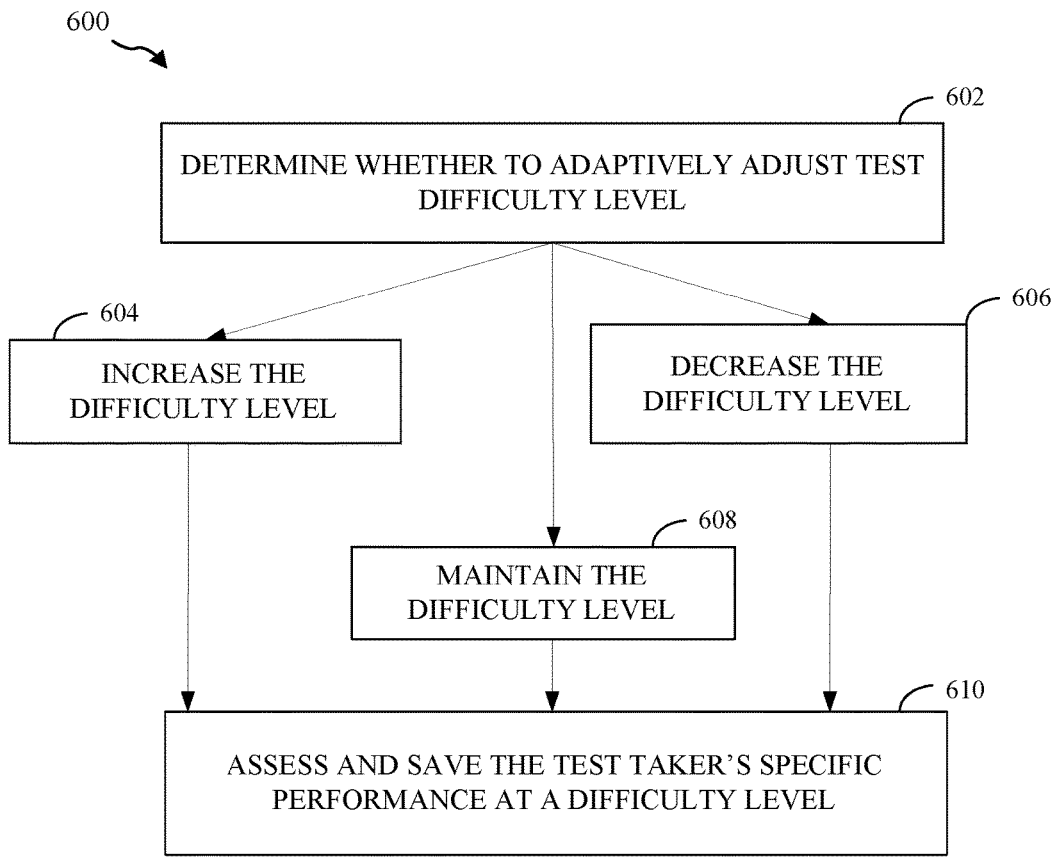
FIGS. 6 and 7 are flow diagrams illustrating a method for adaptive adjusting difficulty level of a test according to aspects of the present disclosure.

FIG. 6 is a flow diagram illustrating a method 600 for adaptively adjusting difficulty level of a task according to one aspect of the present disclosure. As shown in FIG. 6, at block 602, the adaptive learning application determines whether to adaptively adjust a task difficulty level. The adaptive learning application quantitatively assesses the aptitude of a user, such as a child, based on task performance. The task performance may be based on results of one or more previous tasks. The content, difficulty level, and frequency of the questions may be adjusted adaptively based on the user's performance.

Based on the determination at block 602, the adaptive learning application may increase the difficulty level at block 604, decrease the difficulty level at block 606, or keep the difficulty level same at block 608. The difficulty level may be adjusted for specific subjects or for all subjects. At block 604 and block 606, the adaptive learning application may also determine an amount of difficulty level to increase or decrease based on a number of factors. The factors may include, but are not limited to, the user's current performance, level of interest in the current test subject, the user's motivational mindset as described above, and/or other extraneous factors. The extraneous factors may include, but are not limited to, events that are not directly related to test taking itself, such as whether there is a homework assignment on the same or related subject, and/or whether there is a pending school exam on the subject.

At block 610, the adaptive learning application may assess the user's motivational mindset, skill level, and/or aptitude. For example, the adaptive learning application may determine the factors that have the greatest motivation for the user, such as intrinsic or extrinsic motivational factors. The assessment may be used to determine the proper feedback and reward/incentive for correct answers and/or for progressing to a new level. This assessment information may be sent to the task administrator's dashboard for review with the user. Furthermore, at block 610, the adaptive learning application may also learn and save the user's specific performance at a difficulty level. In one example, the adaptive learning application learns and keeps a record of how fast the user mastered the difficulty level of the subject matter and the areas of good performance and poor performance. The areas may refer to entire subjects or subcategories of a subject. For example, math may be a subject and algebra, geometry, and calculus may be specific subcategories of the subject.

Figure 7:
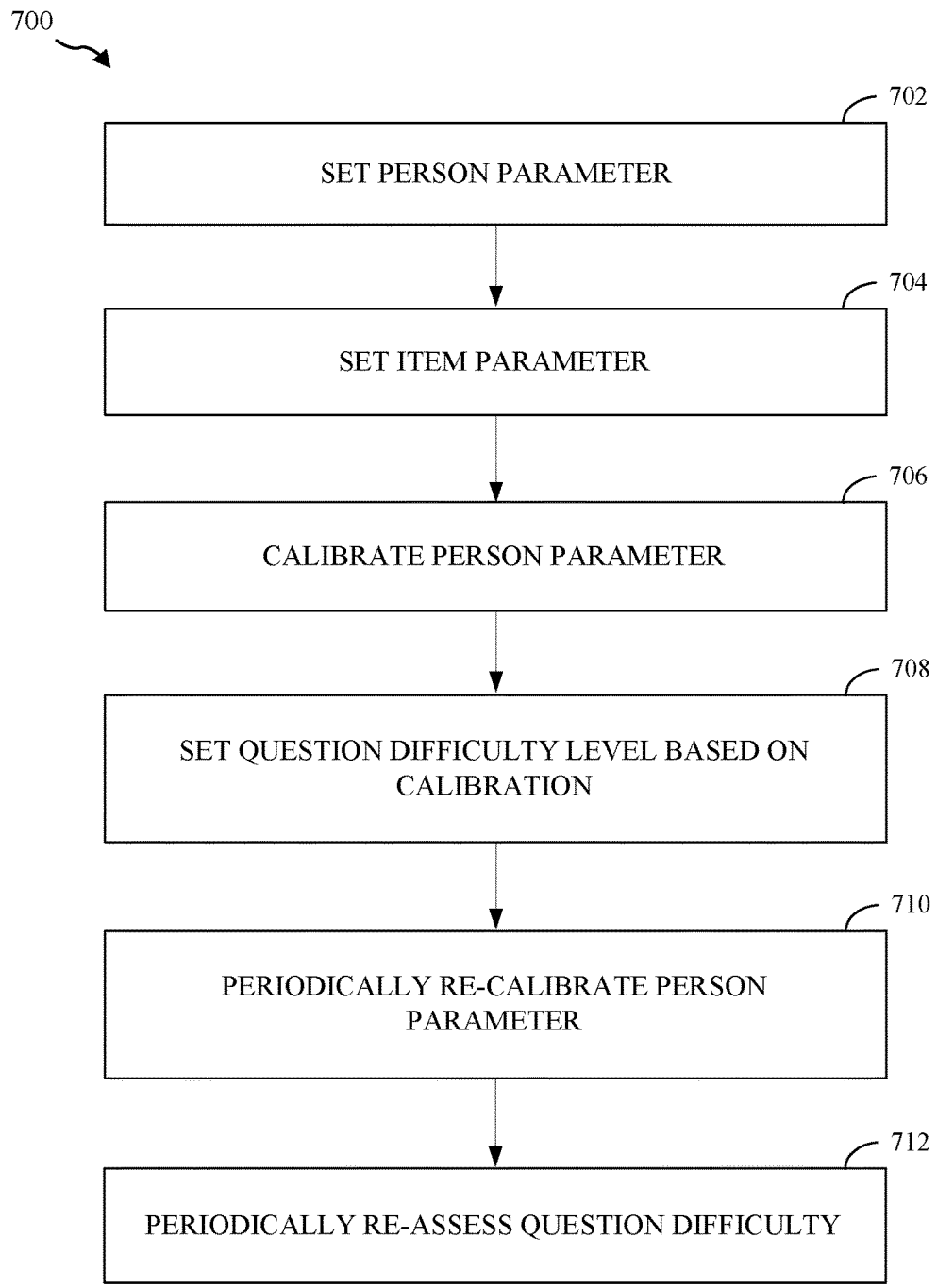

FIG. 7 illustrates a flow diagram 700 for dynamically adjusting a difficulty level according to an aspect of the present disclosure. As shown in FIG. 7, at block 702, a person parameter is specified for a user. The person parameter may include the user's age, grade, and/or proficiency in specific subject matter. For example, the user may have a higher proficiency in math than English, thus, the math questions may be more difficult than the English questions. The proficiency may be based on a specified scale, such as a scale of 1 (low) to 10 (high). In block 704 an item parameter (e.g., question difficulty level) is set for a specific user. In one configuration, the initial person parameter and item parameter are defined based on the grade level of the user and the US DOE specifications on what a user should be to understand at that given grade level.

After setting the baseline for both the question difficulty (e.g., item parameter) and user proficiency (e.g., person parameter), a calibration process is initiated (block 706). The calibration asks the user a predetermined number of questions, such as 50 questions, which may or may not be of the same subject type (such as addition). Based on the user's score during the calibration, at block 708 the difficulty level will be set for the user. During the assessment period the probability of the user correctly answering the question will be determined as follows:

$$p(x_j = 1 \mid \theta_i, \beta_j) = \frac{e^{(\theta_i - \beta_j)}}{1 + e^{(\theta_i - \beta_j)}} \qquad (2)$$

In addition to calibrating the user's difficulty level, the questions may be calibrated to maintain an accuracy of a question's assigned difficulty level, at block 710. Data from answered questions may be used to determine the accuracy of the question difficulty level. For example, if the first student answered a first question correctly and a second student answered the first question incorrectly, it may be assumed that the first student has a higher understanding of the topic then the second student. Therefore, the difficulty level of the first question should reflect the different levels of student understanding by adjusting the question's difficulty level to match the assumed aptitude level of the students. This re-assessment may occur instantaneously or periodically. For example, the periodic re-assessment may occur once a month. Additionally, the re-assessment may occur for questions that have been answered by more than a predetermined number of students, such as ten, of varying difficulty levels.

In addition to calibrating the user's difficulty level, the questions may be calibrated to maintain an accuracy of a question's assigned difficulty level, at block 712. Data from answered questions may be used to determine the accuracy of the question difficulty level. For example, if the first student answered a first question correctly and a second student answered the first question incorrectly, it may be assumed that the first student has a higher understanding of the topic then the second student. Therefore, the difficulty level of the first question should reflect the different levels of student understanding by adjusting the questions difficulty level to match the assumed aptitude level of the students. This re-assessment may periodically occur, such as once a month. Additionally, the re-assessment may occur for questions that have been answered by more than a predetermined number of students, such as ten, of varying difficulty levels.

In one configuration, the task screen of an adaptive learning application may be monitored and configured remotely by a task administrator. The task administrator may be presented with one or more options to control access to the mobile device. These options may include, but are not limited to: subject matter, number of questions to answer before the device is unlocked, and/or duration of each unlock period. In one example aspect, the task administrator may initiate a full lock out, which can be viewed as essentially grounding the child from their mobile device.

As illustrated in FIG. 3, the adaptive learning application may use cloud components to track quiz performance and to provide detailed reporting on topics including, but not limited to: quiz duration, number of correct answers, incorrect answers, duration between answering questions, and/or strengths and weaknesses.

Furthermore, based on the monitoring, the task administrator may remotely lock and/or unlock the task screen. Additionally, the task administrator may be able to remotely adjust difficultly level of a test subject, various predetermined thresholds, and/or durations. For example, the task administrator may adjust the unlock duration. Additionally, the task administrator may also turn on or off system-wide settings such as automatic saving of task results and a task state, and/or enabling/disabling access to emergency call capability. In one configuration, the capability of turning on/off system setting allows for testing the adaptive learning application during an application test period.

Furthermore, the adaptive learning application may remotely enable or disable alerts and/or reports of task related information, on a per task basis or on a per user basis. In one configuration, the task administrator sets up triggers and/or alarms that will alert the task administrator via short message service (SMS), simple network management protocol (SNMP) trap, and/or email when certain thresholds are reached. The thresholds may include, for example, a predefined level of achievement, a predefined level of performance or progress, etc. The triggers and/or alarms may also be set to be sent at a desired schedule.

In one configuration, the adaptive learning application allows the task administrator to remotely send, change, and/or cancel rewards to the user. In one example, a task administrator may load allowance money into an account of the user with the adaptive learning system that can be used as a reward for reaching certain achievement levels. The allowance can be earned based on criteria defined by the task administrator. The reward criteria may be stored in a cloud database and may be remotely updated and controlled by the task administrator. For example, after earning an allowance, the child can redeem the allowance for gift cards at various online and brick and mortar retailers such as Amazon, Walmart, etc.

Aspects of the present disclosure have described the adaptive learning application for use with a mobile device. Still, aspects of the present disclosure are not limited to implementing the adaptive learning application on a mobile device and are also contemplated for using the adaptive learning application on other types of devices, such as gaming consoles, televisions, computers, and/or any other type of device. Furthermore, the adaptive learning application is not limited to granting access to a device and may also be used to grant access to specific applications.

The adaptive learning application may have a different deployment mode. In one example mode, the adaptive learning application may be purchased and downloaded into a mobile device as a standalone application. In an alternative deployment mode, a subscription model may allow users to subscribe to the adaptive learning application that runs on a mobile device and/or the network cloud. For a monthly fee, a subscriber may obtain accesses to the adaptive learning application and related data in the cloud. In another configuration, some aspects of the learning application may be made available for free to the user and other aspects may be made available for a fee (one time or recurring). In another configuration, some or all aspects of the learning application may be made available for free permanently or for a predetermined amount of time.

Figure 8:
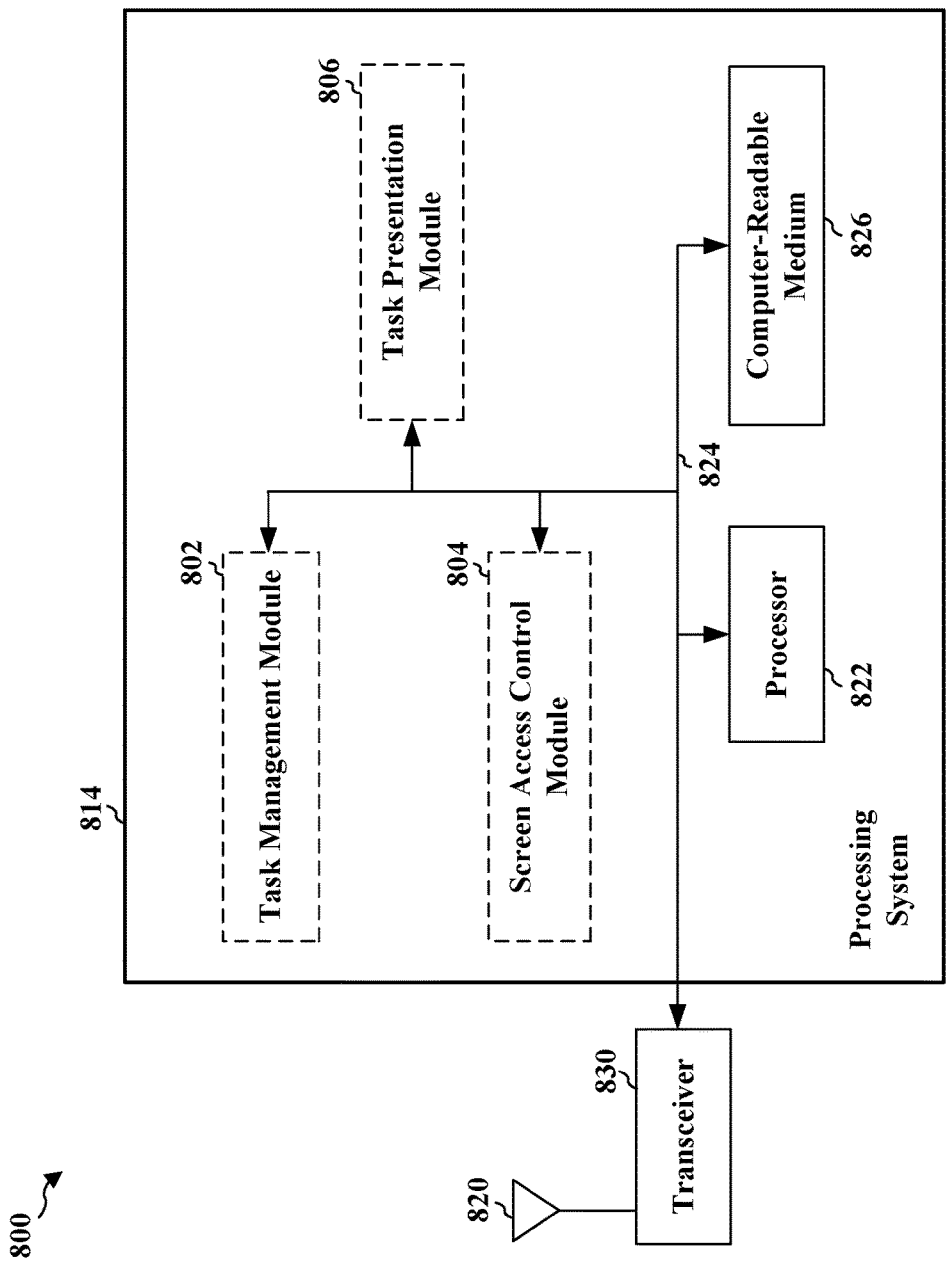
FIG. 8 is block diagram illustrating different modules/means/components for adaptive learning in an example apparatus according to one aspect of the present disclosure.

FIG. 8 is block diagrams illustrating different modules/means/components for adaptive learning in an example apparatus according to one aspect of the present disclosure.

FIG. 8 is a block diagram illustrating an example of a hardware implementation for an apparatus 800 employing a processing system 814 with different modules/means/components for an adaptive learning application in an example apparatus according to one aspect of the present disclosure. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 822 the modules 802, 804, 806 and the non-transitory computer-readable medium 826. The bus 824 may also link various other circuits such as timing sources, peripherals, voltage regulators, and power management circuits, which are well known in the art, and therefore, will not be described any further.

The apparatus includes a processing system 814 coupled to a transceiver 830. The transceiver 830 is coupled to one or more antennas 820. The transceiver 830 enables communicating with various other apparatus over a transmission medium. The processing system 814 includes a processor 822 coupled to a non-transitory computer-readable medium 826. The processor 822 is responsible for general processing, including the execution of software stored on the computer-readable medium 826. The software, when executed by the processor 822, causes the processing system 814 to perform the various functions described for any particular apparatus. The computer-readable medium 826 may also be used for storing data that is manipulated by the processor 822 when executing software.

The processing system 814 includes a task interface management module 802 for managing interfaces to various external components that may include, but are not limited to the cloud databases, underlying wireless and wired networks and various mobile devices. The processing system 814 also includes a remote control module 804 for a third party such as a parent (e.g., task administrator) to remotely control various preferences, thresholds, locking/unlocking of a task screen, and/or setting/enabling/disabling various system parameters. The processing system 814 may also include an adaptive learning module 806 for implementing the adaptive learning algorithms described above. The modules 802, 804 and 806 may be software modules running in the processor 822, resident/stored in the computer-readable medium 826, one or more hardware modules coupled to the processor 822, or some combination thereof. The processing system 814 may be a component of a mobile device which hosts the adaptive learning application.

Figure 9:
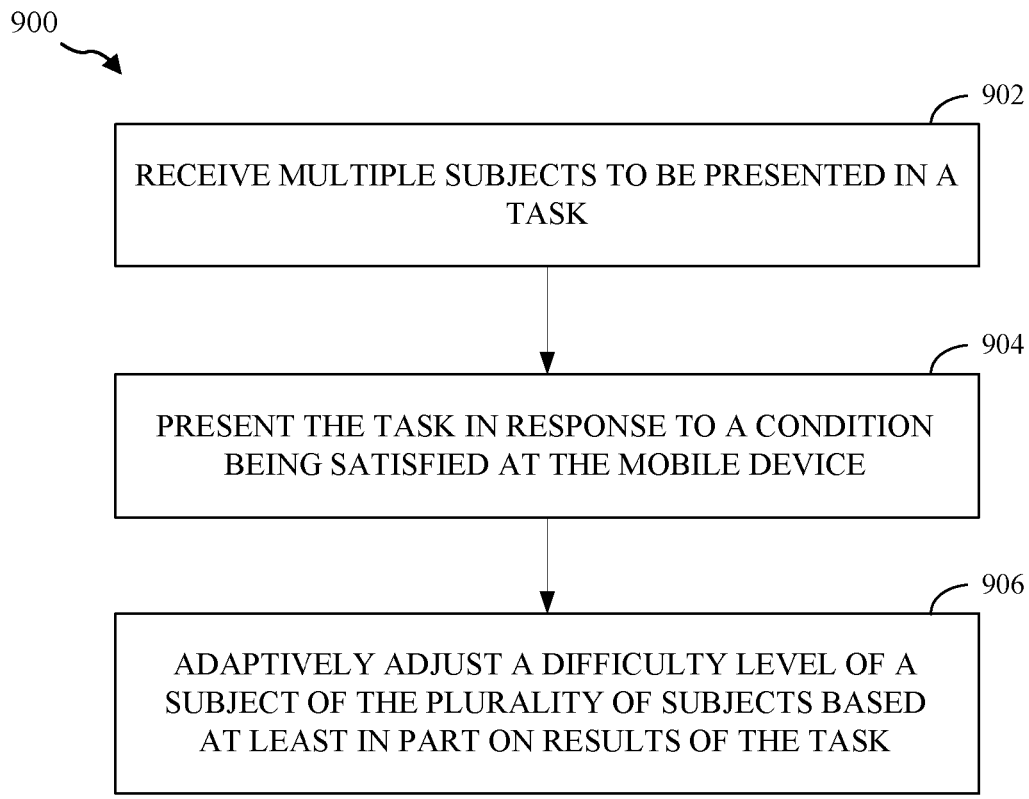
FIG. 9 is a flow diagram illustrating a method for adaptive learning according to an aspect of the present disclosure.

FIG. 9 illustrates a flow diagram for a method 900 of providing a task via a mobile device. At block 902, the mobile device receives multiple subjects to be presented in a task. Furthermore, at block 904, the mobile device presents the task in response to a condition being satisfied at the mobile device. At block 906, the mobile device adaptively adjusts a difficulty level of a subject of the plurality of subjects based at least in part on results of the task.

The present invention is directed to an application, such as a proprietary application installed on a mobile device(s). The application may include a captive portal that restricts access to the said device and a corresponding cloud based management system. Aspects of the present disclosure are directed to a child as a user and a parent as a task administrator. Still, aspects of the present disclosure are not limited to the user being a child and the task administrator being a parent. Of course, aspects of the present disclosure are contemplated for any type of user that requests access to a device and any type of administrator that desires to restrict a user's access to a device. For example, the user may be an employee and the task administrator may be management. For the purpose of this disclosure, the term "parent" will refer to any individual or group of individuals which administrative access to the application and the term "child" and/or "children" refers to any individual or group of individuals whose access to the mobile device is desired to be restricted by the administrator.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

It is also to be understood that the terms "user," "child," "task performer," and "test taker" may be used interchangeably wherever the contexts are appropriate. The term mobile device may include any electronic device that is portable, including, but not limited to mobile phones, laptops, iPads, tablets, game consoles, personal data assistants (PDAs), and electronic readers.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for controlling access to a device, the method comprising:
   receiving, at the device from a remote device, a plurality of exercises to be presented to a device user and a condition for presenting the plurality of exercises;
   determining, at the device, whether the condition is satisfied;
   restricting access to the device in response to the condition being satisfied;
   presenting, at the device, an initial exercises of the plurality of exercises in response to the condition being satisfied, a difficulty level for an initial exercise of the plurality of exercises based on a pre-determined proficiency of the device user;
   determining, at the device for each exercise after an initial exercise, a probability of the device user successfully performing a current exercise of the plurality of exercises based on whether the device user correctly performed a previous exercise, a proportion of other users successfully performing the current exercise, and a variation in proficiency of the other users that successfully performed the current exercise;
   adjusting, at the device, the difficulty level for the current exercise based on the determined probability; and
   granting, at the device, access to the device upon successful completion of a set of exercises of the plurality of exercises.

2. The method of claim 1, further comprising presenting the plurality of exercises when access to the device is restricted.

3. The method of claim 1, in which adjusting the difficulty level comprises:
   increasing the difficulty level when the probability is equal to or greater than a threshold; and
   decreasing the difficulty level when the probability is less than the threshold.

4. The method of claim 1, further comprising providing remote access to the remote device to remotely configure settings on the device.

5. The method of claim 4, in which the settings comprises at least one:
   a restricted access state, the difficulty level, a duration of an unrestricted period, a probability threshold, a learning category, subject matter of each exercise, a maximum number of exercises per day, a time between presenting the plurality of exercises, rewards, result alerts, result saving, or a combination thereof.

6. The method of claim 1, in which each exercise is presented as at least one of a multiple choice quiz, an interactive audio dialogue session, an interactive video session, an interactive written session, an interactive gaming session, a static or interactive advertising session, or a combination thereof.

7. The method of claim 1, further comprising presenting a reward when a performance level is greater than or equal to a performance threshold.

8. An apparatus comprising an access control system, the apparatus comprising:
   a memory; and
   at least one processor coupled to the memory, the at least one processor configured:
   to receive, from a remote device, a plurality of exercises to be presented to a user for the task and a condition for presenting the task;
   to determine whether the condition is satisfied;
   to restrict access to the apparatus in response to the condition being satisfied;
   to present an initial exercises of the plurality of exercises in response to the condition being satisfied, a difficulty level for an initial exercise of the plurality of exercises based on a pre-determined proficiency of the device user;
   to determine, for each exercise after an initial exercise, a probability of the device user successfully performing a current exercise of the plurality of exercises based on whether the device user correctly performed a previous exercise, a proportion of other users successfully performing the current exercise, and a variation in proficiency of the other users that successfully performed the current exercise;
   to adjust the difficulty level for the second exercise based on the determined probability; and
   to grant access to the apparatus upon successful completion of a set of exercises of the task.

9. The apparatus of claim 8, in which the at least one processor is further configured to present the plurality of exercises when access to the device is restricted.

10. The apparatus of claim 8, in which the at least one processor is further configured:
to increase the difficulty level when the probability is equal to or greater than a threshold; and
to decrease the difficulty level when the probability is less than the threshold.

11. The apparatus of claim 8, in which the at least one processor is further configured to provide remote access to the remote device to remotely configure settings on the device.

12. The apparatus of claim 11, in which the settings comprises at least one:
a restricted access state, the difficulty level, a duration of an unrestricted period, a probability threshold, a learning category, subject matter of each exercise, a maximum number of exercises per day, a time between tasks, task rewards, task result alerts, task result saving, or a combination thereof.

13. The apparatus of claim 8, in which each exercise is presented as at least one of a multiple choice quiz, an interactive audio dialogue session, an interactive video session, an interactive written session, an interactive game, a static or interactive advertisement, or a combination thereof.

14. The apparatus of claim 8, in which the at least one processor is further configured to present a reward when a performance level is greater than or equal to a performance threshold.

15. A non-transitory computer-readable medium having program code recorded thereon for controlling access to a device, the program code being executed by a processor of the device and comprising:
program code to receive, from a remote device, a plurality of exercises to be presented to a device user for the task and a condition for presenting the task;
program code to determine whether the condition is satisfied;
program code to restrict access to the device in response to the condition being satisfied;
program code to present an initial exercises of the plurality of exercises in response to the condition being satisfied, a difficulty level for an initial exercise of the plurality of exercises based on a pre-determined proficiency of the device user;
program code to determine, for each exercise after an initial exercise, a probability of the device user successfully performing a current exercise of the plurality of exercises based on whether the device user correctly performed a previous exercise, a proportion of other users successfully performing the current exercise, and a variation in proficiency of the other users that successfully performed the current exercise;
program code to adjust the difficulty level for the second exercise based on the determined probability; and
program code to grant access to the device upon successful completion of a set of exercises from the plurality of exercises.

16. The non-transitory computer-readable medium of claim 15, in which the program code further comprises program code to present the plurality of exercises when access to the device is restricted.

17. The non-transitory computer-readable medium of claim 15, in which the program code further comprises:
program code to increase the difficulty level when the probability is equal to or greater than a threshold; and
program code to decrease the difficulty level when the probability is less than the threshold.

18. The non-transitory computer-readable medium of claim 15, in which the program code further comprises program code to provide remote access to the remote device to remotely configure settings on the device.

19. The non-transitory computer-readable medium of claim 18, in which the settings comprises at least one:
a restricted access state, the difficulty level, a duration of an unrestricted period, a probability threshold, a learning category, subject matter of each exercise, a maximum number of exercises per day, a time between tasks, task rewards, task result alerts, task result saving, or a combination thereof.

20. The non-transitory computer-readable medium of claim 15, in which each exercise is presented as at least one of a multiple choice quiz, an interactive audio dialogue session, an interactive video session, an interactive written session, an interactive game, a static or interactive advertisement, or a combination thereof.

* * * * *